US00RE48658E

(19) United States
(12) Reissued Patent
Irisawa

(10) Patent Number: US RE48,658 E
(45) Date of Reissued Patent: Jul. 27, 2021

(54) EXHAUST GAS PURIFICATION APPARATUS FOR AN INTERNAL COMBUSTION ENGINE

(71) Applicant: TOYOTA JIDOSHA KABUSHIKI KAISHA, Toyota (JP)

(72) Inventor: Yasuyuki Irisawa, Susono (JP)

(73) Assignee: TOYOTA JIDOSHA KABUSHIKI KAISHA, Toyota (JP)

(21) Appl. No.: 16/185,693

(22) Filed: Nov. 9, 2018

Related U.S. Patent Documents

Reissue of:
(64) Patent No.: 9,604,177
Issued: Mar. 28, 2017
Appl. No.: 14/383,266
PCT Filed: Mar. 7, 2012
PCT No.: PCT/JP2012/055778
§ 371 (c)(1),
(2) Date: Sep. 5, 2014
PCT Pub. No.: WO2013/132603
PCT Pub. Date: Sep. 12, 2013

(51) Int. Cl.
*B01D 53/94* (2006.01)
*F01N 13/00* (2010.01)
(Continued)

(52) U.S. Cl.
CPC ..... *B01D 53/9495* (2013.01); *B01D 53/9431* (2013.01); *F01N 3/033* (2013.01);
(Continued)

(58) Field of Classification Search
CPC ..... B01D 53/9495; B01D 53/9431; F01N 3/0821; F01N 3/033; F01N 3/0842;
(Continued)

(56) References Cited

U.S. PATENT DOCUMENTS 9,440,194 B2 * 9/2016 Irisawa ..... B01D 53/9495
2009/0193796 A1 8/2009 Wei et al.
(Continued)

FOREIGN PATENT DOCUMENTS

EP 2063090 A1 5/2009
JP 2004-052680 A 2/2004
(Continued)

*Primary Examiner* — Jerry D Johnson
(74) *Attorney, Agent, or Firm* — Hunton Andrews Kurth LLP

(57) ABSTRACT

A decrease in an NOx removal or reduction rate at the time of filter regeneration is suppressed. To this end, provision is made for an NOx selective reduction catalyst, a filter arranged at the upstream side of the NOx selective reduction catalyst, an $NH_3$ generation catalyst arranged at the upstream side of the NOx selective reduction catalyst to generate $NH_3$ when the air fuel ratio of an exhaust gas is equal to or less than a stoichiometric air fuel ratio, a regeneration unit to carry out regeneration of the filter, and a generation unit to make the air fuel ratio of the exhaust gas equal to or less than the stoichiometric air fuel ratio, thereby causing $NH_3$ to be generated in the $NH_3$ generation catalyst, wherein the regeneration unit inhibits the regeneration of the filter until the generation of $NH_3$ by the generation unit is completed.

15 Claims, 6 Drawing Sheets

(51) Int. Cl.

| | |
|---|---|
| ***F01N 3/033*** | (2006.01) |
| ***F01N 3/08*** | (2006.01) |
| ***F01N 3/10*** | (2006.01) |
| ***F01N 3/20*** | (2006.01) |
| ***F02D 41/02*** | (2006.01) |
| ***F01N 9/00*** | (2006.01) |
| ***F02D 41/14*** | (2006.01) |

(52) U.S. Cl.
CPC ..... *F01N 3/0814* (2013.01); *F01N 3/0821* (2013.01); *F01N 3/0842* (2013.01); *F01N 3/101* (2013.01); *F01N 3/2073* (2013.01); *F01N 13/009* (2014.06); *F02D 41/029* (2013.01); *F02D 41/0235* (2013.01); *F01N 9/002* (2013.01); *F01N 2240/25* (2013.01); *F01N 2570/18* (2013.01); *F01N 2900/1402* (2013.01); *F01N 2900/1602* (2013.01); *F02D 41/0275* (2013.01); *F02D 41/1446* (2013.01); *F02D 41/1456* (2013.01); *F02D 2200/0812* (2013.01); *Y02T 10/12* (2013.01)

(58) Field of Classification Search
CPC ..... F01N 3/0814; F01N 3/101; F01N 3/2073; F01N 13/009; F01N 2240/25; F01N 2570/18; F01N 2900/1402; F01N 2900/1602; F01N 9/002; F02D 41/0235; F02D 41/0259; F02D 41/1446; F02D 41/1456; F02D 2200/0812; F02D 41/0275
See application file for complete search history.

(56) References Cited

U.S. PATENT DOCUMENTS

| | | | | |
|---|---|---|---|---|
| 2011/0023462 | A1* | 2/2011 | Kurtz | F01N 3/0842 60/286 |
| 2015/0047319 | A1* | 2/2015 | Larose, Jr. | F01N 3/208 60/274 |
| 2015/0174529 | A1* | 6/2015 | Irisawa | F01N 3/021 422/114 |
| 2015/0314239 | A1* | 11/2015 | Kawaguchi | B01D 53/9477 422/111 |
| 2015/0322837 | A1* | 11/2015 | Takada | F01N 3/106 422/111 |
| 2020/0063632 | A1* | 2/2020 | Hendrickson | F01N 3/2066 |

FOREIGN PATENT DOCUMENTS

| | | | |
|---|---|---|---|
| JP | 2007-255289 | A | 10/2007 |
| JP | 2009-127559 | A | 6/2009 |
| JP | 2009-264181 | A | 11/2009 |
| JP | 2011-525579 | A | 9/2011 |
| JP | 2012-002064 | A | 1/2012 |

* cited by examiner

EXHAUST GAS PURIFICATION APPARATUS FOR AN INTERNAL COMBUSTION ENGINE

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCE TO RELATED APPLICATIONS

*This is an application for reissue of U.S. Pat. No. 9,604,177.*

This is a national phase application based on the PCT International Patent Application No. PCT/JP2012/055778 filed Mar. 7, 2012, the entire contents of which are incorporated herein by reference.

TECHNICAL FIELD

The present invention relates to an exhaust gas purification apparatus for an internal combustion engine.

BACKGROUND ART

Provision may be made for a filter which traps particulate matter (hereinafter also referred to as PM) in an exhaust gas. The PM trapped by this filter can be removed by raising the temperature of the filter as well as increasing the concentration of oxygen in the exhaust gas. Removal of the PM from the filter in this manner is referred to as regeneration of the filter. Then, there has been known a technology which enhances efficiency at the time of raising the temperature of a filter by prohibiting regeneration of the filter when ambient air temperature is equal to or less than a predetermined value (for example, refer to a first patent literature).

In addition, there has been known a technology in which at the time of regeneration of a filter, NOx is supplied to the filter from an adsorbent for NOx which is provided at the upstream side of the filter (for example, refer to a second patent literature). In this technology, oxidation of the PM is promoted by NOx. Also, a necessary amount of NOx is made to adsorb to the NOx adsorbent in advance before the regeneration of the filter.

Moreover, there has been known a technology in which a three-way catalyst is provided at the downstream side of a filter, so that the air fuel ratio of an exhaust gas is adjusted to be in the vicinity of a stoichiometric air fuel ratio at which NOx is able to be removed or reduced in the three-way catalyst, after which the air fuel ratio is adjusted to be a lean air fuel ratio with which the filter is able to be regenerated (for example, refer to a third patent literature).

However, an NOx storage reduction catalyst (hereinafter, also referred to as an NSR catalyst) and an NOx selective reduction catalyst (hereinafter, also referred to as an SCR catalyst) may be provided at the downstream side of a filter which traps particulate matter in exhaust gas. This NSR catalyst serves to occlude or store NOx contained in the incoming exhaust gas when the oxygen concentration of the exhaust gas is high, and to reduce the occluded or stored NOx when the oxygen concentration of the incoming exhaust gas becomes low and when a reducing agent exists.

In addition, this SCR catalyst is a catalyst which serves to carry out selective reduction of NOx by means of the reducing agent.

Here, at the time of regeneration of the filter, it is necessary to make high the concentration of oxygen in the exhaust gas which flows into the filter. In addition, it is also necessary to make the temperature of the filter high. In such a state, it becomes difficult for the NSR catalyst to store NOx. Moreover, it becomes difficult to supply the reducing agent to the SCR catalyst. Accordingly, there is a fear that at the time of regeneration of the filter, the removal or reduction rate of NOx may decrease.

PRIOR ART REFERENCES

Patent Literatures

[First Patent Literature] Japanese patent laid-open publication No. 2007-255289

[Second Patent Literature] Japanese patent application laid-open No. 2004-052680

[Third Patent Literature] Japanese patent application laid-open No. 2009-127559

SUMMARY OF THE INVENTION

Problems to be Solved by the Invention

The present invention has been made in view of the problems as referred to above, and has for its object to suppress a decrease in an NOx removal or reduction rate at the time of filter regeneration.

Means for Solving the Problems

In order to achieve the above-mentioned object, an exhaust gas purification apparatus for an internal combustion engine according to the present invention is provided with an NOx selective reduction catalyst that is arranged in an exhaust passage of the internal combustion engine and reduces NOx by using $NH_3$ as a reducing agent;

a filter that is arranged in the exhaust passage at the upstream side of said NOx selective reduction catalyst and traps particulate matter contained in the exhaust gas;

an $NH_3$ generation catalyst that is arranged in the exhaust passage at the upstream side of said NOx selective reduction catalyst and generates $NH_3$ when the air fuel ratio of the exhaust gas is equal to or less than a stoichiometric air fuel ratio;

a regeneration unit that regenerates said filter by supplying oxygen to said filter while raising the temperature of said filter; and a generation unit that makes the air fuel ratio of the exhaust gas equal to or less than the stoichiometric air fuel ratio, thereby causing $NH_3$ to be generated in said $NH_3$ generation catalyst;

wherein said regeneration unit inhibits the regeneration of said filter until the generation of $NH_3$ by said generation unit is completed.

The $NH_3$ generation catalyst is, for example, a catalyst which causes $H_2$ or HC to react with NO, thereby to generate $NH_3$. Any one of the filter and the $NH_3$ generation catalyst may be arranged at the upstream side of the other. The NOx selective reduction catalyst adsorbs $NH_3$, and reduces NOx by means of the $NH_3$.

The regeneration unit raises the temperature of the filter to a temperature at which the PM trapped by the filter is oxidized, and enhances the concentration of oxygen in the exhaust gas by adjusting the air fuel ratio of the exhaust gas flowing into the filter to a lean air fuel ratio. As a result of this, the PM is oxidized.

The generation unit causes $NH_3$ to be generated before the regeneration of the filter is carried out. That is, before the regeneration of the filter is carried out, the air fuel ratio of the exhaust gas flowing into the $NH_3$ generation catalyst is made equal to or less than the stoichiometric air fuel ratio. Here, note that after the generation of $NH_3$ by the generation unit is completed, the regeneration unit may start the regeneration of the filter.

Here, when $NH_3$ becomes high temperature, it will be hydrolyzed. For this reason, in the course of the regeneration of the filter, it becomes difficult to generate $NH_3$. That is, a condition suitable for the regeneration of the filter and a condition suitable for the generation of $NH_3$ are different from each other, so that it becomes difficult to carry out one of the conditions, while carrying one the other condition. Accordingly, there is a fear that at the time of regeneration of the filter, $NH_3$ may become short or insufficient, so the removal or reduction of NOx may become difficult. In contrast to this, the generation unit generates $NH_3$ before the regeneration of the filter is carried out. That is, before the regeneration of the filter is carried out thereby to make it difficult to generate $NH_3$, $NH_3$ has been generated and made to adsorb to the NOx selective reduction catalyst. In that case, even if $NH_3$ is not generated at the time of regeneration of the filter, NOx can be made to reduce by means of the $NH_3$ which has been made to adsorb to the NOx selective reduction catalyst in advance. As a result of this, both the regeneration of the filter and the removal or reduction of NOx can be made compatible with each other.

In addition, in the present invention, said generation unit can generate $NH_3$ until said NOx selective reduction catalyst adsorbs an amount of $NH_3$ required for removing NOx to be discharged from said internal combustion engine when the regeneration of said filter is carried out.

Here, even if $NH_3$ is made to adsorb to the NOx selective reduction catalyst before the regeneration of the filter, there will be a fear that $NH_3$ may run short during the regeneration of the filter, in cases where the amount of $NH_3$ thus adsorbed is small. As a result of this, there will also be a fear that in the course of the regeneration of the filter, it may become difficult to remove or reduce the NOx.

Accordingly, the generation unit causes $NH_3$ to be generated in advance before the regeneration of the filter is carried out, so that $NH_3$ does not nm short when the regeneration of the filter is being carried out. Here, if a sufficient amount of $NH_3$ has been made to absorb to the NOx selective reduction catalyst, it is possible to suppress the $NH_3$ from running short during the course of regeneration of the filter. That is, if an amount of $NH_3$, which is equal to or larger than that to be consumed until the regeneration of the filter is completed, has been made to absorb to the NOx selective reduction catalyst in advance, it will be possible to suppress the $NH_3$ from running short during the course of regeneration of the filter.

The amount of $NH_3$ to be consumed until the regeneration of the filter is completed can be calculated based on an amount of NOx to be discharged from the internal combustion engine until the regeneration of the filter is completed. The amount of NOx to be discharged from the internal combustion engine can be estimated by, for example, assuming that the operating state of the internal combustion engine at the current point in time continues. In addition, according to an amount of PM trapped by the filter, a period of time, which is required for the regeneration of the filter, becomes longer, so that an amount of NOx to be discharged also increases. Accordingly, the amount of NOx to be discharged until the completion of the regeneration of the filter may be estimated according to the amount of the PM trapped in the filter.

Moreover, in the present invention, in cases where the amount of $NH_3$ adsorbed to said NOx selective reduction catalyst becomes equal to or less than a predetermined value, during the regeneration of said filter, said regeneration unit can interrupt the regeneration of said filter.

Here, when the regeneration of the filter is carried out, the $NH_3$ adsorbed to the NOx selective reduction catalyst is used in order to remove or reduce NOx, so the $NH_3$ decreases gradually. Then, when a period of time to regenerate the filter becomes long, the $NH_3$ adsorbed to the NOx selective reduction catalyst may be used up. Here, note that even if the sufficient amount of $NH_3$ has been made to adsorb to the NOx selective reduction catalyst before the regeneration of the filter, the amount of NOx to be discharged will change when the operating region of the internal combustion engine changes during the regeneration of the filter, as a result of which $NH_3$ may become short or insufficient. Thus, when $NH_3$ runs short, the removal or reduction of NOx will become difficult.

In addition, the NOx selective reduction catalyst has an upper limit of temperature (hereinafter, also referred to as an upper limit temperature) at which the NOx selective reduction catalyst is able to adsorb NH3, and when this upper limit temperature is exceeded, the NH3 adsorbed to the NOx selective reduction catalyst will be released into the exhaust gas. Accordingly, when the temperature of the NOx selective reduction catalyst exceeds the upper limit temperature during the regeneration of the filter, the removal or reduction of NOx will become difficult.

Accordingly, in cases where the amount of $NH_3$ has become equal to or less than the predetermined value, the regeneration unit interrupts the regeneration of the filter. The predetermined value referred to herein is an upper limit value of the amount of adsorption at which it becomes unable to reduce NOx at the time of the regeneration of the filter. Here, note that the predetermined value may also be 0. That is, when the $NH_3$ having been adsorbed by the NOx selective reduction catalyst has been used up, the regeneration of the filter may also be interrupted. In addition, in cases where it can be predicted that the $NH_3$ having been adsorbed by the NOx selective reduction catalyst will be used up, the regeneration of the filter may also be interrupted. Moreover, in cases where the temperature of the NOx selective reduction catalyst has become higher than a temperature at which it is able to adsorb $NH_3$, the regeneration of the filter may also be interrupted. Thus, by interrupting the regeneration of the filter, it is possible to suppress the removal or reduction of NOx from becoming unable to be carried out due to a shortage of the reducing agent.

In addition, in the present invention, when said regeneration unit has interrupted the regeneration of said filter, said generation unit can make the air fuel ratio of the exhaust gas equal to or less than the stoichiometric air fuel ratio, thereby making it possible to generate $NH_3$.

If $NH_3$ is made to be generated by means of the generation unit at the time when the regeneration of the filter is interrupted, the NOx selective reduction catalyst can adsorb the $NH_3$ again. In that case, when the regeneration of the filter is resumed, it becomes possible to remove or reduce NOx. Here, note that when the amount of $NH_3$ having been adsorbed to the NOx selective reduction catalyst becomes sufficiently large, the generation of $NH_3$ may be ended, and the regeneration of the filter may also be resumed.

Moreover, in the present invention, even if the regeneration of said filter is resumed, said generation unit can cause $NH_3$ to be generated until said NOx selective reduction catalyst adsorbs an amount of $NH_3$ so that the amount of $NH_3$ adsorbed to said NOx selective reduction catalyst does not become equal to or less than said predetermined value, at the time of carrying out the regeneration of said filter; and even if the regeneration of said filter is resumed, said regeneration unit can resume the regeneration of said filter after said NOx selective reduction catalyst has adsorbed an amount of $NH_3$ so that the amount of $NH_3$ adsorbed to said NOx selective reduction catalyst does not become equal to or less than said predetermined value, at the time of carrying out the regeneration of said filter.

Here, note that even if $NH_3$ has been made to adsorb to the NOx selective reduction catalyst during the interruption of the regeneration of the filter, in cases where the amount of $NH_3$ thus adsorbed is small, the amount of $NH_3$ having been adsorbed by the NOx selective reduction catalyst will become equal to or less than the predetermined value, after the regeneration of the filter 5 is resumed. In that case, it is necessary to interrupt the regeneration of the filter again. For this reason, it becomes necessary to raise the temperature of the filter in a repeated manner, so there is a fear that fuel economy may deteriorate. In addition, it will take a longer period of time until the regeneration of the filter is completed.

Accordingly, the generation unit has generated $NH_3$, so that it is not necessary to interrupt the regeneration of the filter, after the regeneration of the filter is made to resume. Here, if a sufficient amount of $NH_3$ has been made to absorb to the NOx selective reduction catalyst, there will be no need to interrupt the regeneration of the filter. Then, if the regeneration unit resumes the regeneration of the filter after an amount of $NH_3$, which is equal to or larger than that to be consumed until the regeneration of the filter is completed, has been made to absorb to the NOx selective reduction catalyst in advance, there will be no need to interrupt the regeneration of the filter.

Further, in the present invention, said regeneration unit can start the regeneration of said filter when an amount of particulate matter trapped in said filter becomes equal to or greater than a threshold value, and can set said threshold value in such a manner that the NOx to be discharged from said internal combustion engine in a period of time from when the regeneration of said filter is started until it is completed becomes able to be removed by the amount of $NH_3$ having been adsorbed to said NOx selective reduction catalyst.

That is, it is possible to set a point in time to start the regeneration of the filter or a period of time from the start of the regeneration of the filter to the completion or end thereof according to the amount of $NH_3$ which has been adsorbed by the NOx selective reduction catalyst. Here, the more the amount of particulate matter trapped in the filter, the longer becomes the period of time to carry out the regeneration of the filter. Accordingly, the more the amount of particulate matter trapped in the filter, the larger is the amount of $NH_3$ which is required to have been adsorbed to the NOx selective reduction catalyst. However, the amount of $NH_3$, which is able to be adsorbed to the NOx selective reduction catalyst, has a limitation. In addition, a sufficient amount of $NH_3$ may not be able to be adsorbed to the NOx selective reduction catalyst, depending on the operating state of the internal combustion engine. In contrast to this, if the period of time to carry out the regeneration of the filter is decided according to the amount of $NH_3$ which has been adsorbed by the NOx selective reduction catalyst, it is possible to suppress the $NH_3$ from running short during the course of the regeneration of the filter.

Then, because there is a correlation between the period of time to carry out the regeneration of the filter and the amount of particulate matter trapped in the filter, it is possible to set said threshold value according to the amount of $NH_3$ having been adsorbed by the NOx selective reduction catalyst. For example, the more the amount of $NH_3$ having been absorbed by the NOx selective reduction catalyst, the larger the threshold value may be set. In this manner, it is possible to suppress the $NH_3$ from running short in the course of the regeneration of the filter. Here, note that said threshold value may also be set in such a manner that the amount of NOx to be discharged in the course of the regeneration of said filter becomes equal to or less than an amount of NOx which is able to be removed or reduced with an amount of $NH_3$ which is able to be adsorbed to said NOx selective reduction catalyst. In addition, the larger the extent of the deterioration of the NOx selective reduction catalyst, the smaller becomes the amount of $NH_3$ able to be adsorbed thereto, so the smaller said threshold value may also be set.

In addition, in the present invention, the larger the extent of the deterioration of said NOx selective reduction catalyst, the shorter said regeneration unit can make the interval in which the regeneration of said filter is carried out.

Here, the larger the extent of the deterioration of the NOx selective reduction catalyst, the smaller becomes the amount of $NH_3$ which is able to be adsorbed. For this reason, in cases where the extent of the deterioration of the NOx selective reduction catalyst is large, there is a fear that $NH_3$ may run short in the course of the regeneration of the filter. In contrast to this, by making short the interval in which the regeneration of the filter is carried out, the regeneration of the filter is carried out in a state where the amount of particulate matter trapped in the filter is smaller. As a result of this, the time required for the regeneration of the filter can be shortened, thus making it possible to suppress the $NH_3$ from running short during the course of the regeneration of the filter.

Moreover, in the present invention, said generation unit can adjust the air fuel ratio of the exhaust gas flowing into said $NH_3$ generation catalyst to such a value that falls within a predetermined range including an air fuel ratio at which the amount of generation of $NH_3$ becomes the largest.

Here, by making the air fuel ratio of the exhaust gas equal to or less than the stoichiometric air fuel ratio, $NH_3$ is generated in the $NH_3$ generation catalyst. However, a difference occurs in the amount of generation of $NH_3$ according to the air fuel ratio. In addition, in cases where $H_2$ and/or HC in the exhaust gas is made to react with NO thereby to generate $NH_3$, the NO will be reduced by other catalysts if the air fuel ratio of the exhaust gas is too low. As a result, the NO will run short, thus making it difficult to generate $NH_3$.

On the other hand, by adjusting the air fuel ratio of the exhaust gas to a value suitable for generation of $NH_3$, $NH_3$ can be made to adsorb to the NOx selective reduction catalyst in a quick manner. Here, note that the air fuel ratio within the predetermined range may also be a range of the air fuel ratio in which the amount of generation of $NH_3$ falls within an allowable range. In addition, the generation unit may adjust the air fuel ratio of the exhaust gas flowing into the $NH_3$ generation catalyst to such a value at which the amount of generation of $NH_3$ becomes the largest. Moreover, the air fuel ratio of the exhaust gas flowing into the $NH_3$ generation catalyst may be adjusted to such a value at which an amount of generation of $H_2$ required for generating $NH_3$ becomes the largest. Then, by continuing, for a predetermined period of time, the time in which this air fuel ratio of the exhaust gas is attained, a sufficient amount of $NH_3$ can be made to adsorb to the NOx selective reduction catalyst. The predetermined period of time may be one in which an amount of $NH_3$ required at the time of the regeneration of the filter is adsorbed to the NOx selective reduction catalyst.

Further, in the present invention, at the time of carrying out the regeneration of said filter, said regeneration unit can interrupt the regeneration of said filter, in cases where the temperature of said NOx selective reduction catalyst becomes higher than a temperature able to adsorb $NH_3$, and when said regeneration unit has interrupted the regeneration of said filter, said generation unit can cause $NH_3$ to be generated, by making the air fuel ratio of the exhaust gas equal to or less than the stoichiometric air fuel ratio.

Here, when the temperature of the NOx selective reduction catalyst exceeds the upper limit temperature able to adsorb NH3, the NH3 adsorbed is released into the exhaust gas. As a result, when the temperature of the NOx selective reduction catalyst exceeds said upper limit temperature during the regeneration of the filter, the removal or reduction of NOx will become difficult. Accordingly, in cases where the temperature of the NOx selective reduction catalyst has become higher than the temperature at which it is able to adsorb NH3, the regeneration unit interrupts the regeneration of the filter. Then, if NH3 is made to be generated by the generation unit at the time when the regeneration of the filter has been interrupted, the NOx selective reduction catalyst can adsorb the NH3 again. In that case, when the regeneration of the filter is resumed, it becomes possible to remove or reduce NOx.

Effect of the Invention

According to the present invention, it is possible to suppress a decrease in an NOx removal or reduction rate at the time of filter regeneration.

MODES FOR CARRYING OUT THE INVENTION

Hereinafter, reference will be made to specific embodiments of an exhaust gas purification apparatus for an internal combustion engine according to the present invention based on the attached drawings.

First Embodiment

Figure 1:
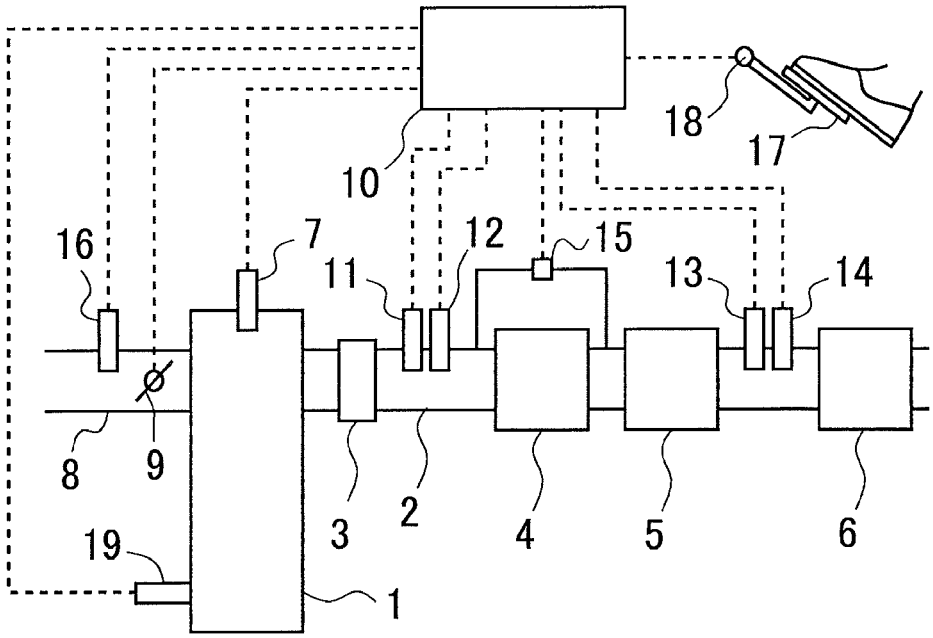
FIG. 1 is a view showing the schematic construction of an internal combustion engine as well as its intake and exhaust systems according to embodiments of the present invention.

FIG. 1 is a view showing the schematic construction of an internal combustion engine as well as its intake and exhaust systems according to embodiments of the present invention. The internal combustion engine 1 shown in FIG. 1 is a gasoline engine, but it may be a diesel engine. The internal combustion engine 1 is installed on a vehicle, for example.

An exhaust passage 2 is connected to the internal combustion engine 1. In the middle of the exhaust passage 2, a three-way catalyst 3, a filter 4, an NOx storage reduction catalyst 5 (hereinafter referred to as an NSR catalyst 5) and an NOx selective reduction catalyst 6 (hereinafter referred to as an SCR catalyst 6) are sequentially provided in this order from an upstream side. Here, note that the order of the filter 4 and the NSR catalyst 5 may be reversed.

The three-way catalyst 3 serves to purify or remove NOx, HC and CO with a maximum efficiency at the time when a catalytic atmosphere is at a stoichiometric air fuel ratio. In addition, the three-way catalyst 3 has oxygen storage ability. That is, when the air fuel ratio of an incoming exhaust gas is a lean air fuel ratio, the three-way catalyst 3 occludes or stores an excess of oxygen, whereas when the air fuel ratio of the incoming exhaust gas is a rich air fuel ratio, the three-way catalyst 3 releases or supplies a shortage of oxygen, thereby purifying the exhaust gas.

In addition, the filter 4 traps particulate matter (PM) contained in the exhaust gas. Here, note that a catalyst may be supported on the filter 4. As the particulate matter is trapped by the filter 4, the particulate matter accumulates or deposits on the filter 4 in a gradual manner. Then, by carrying out so-called regeneration processing of the filter 4 in which the temperature of the filter 4 is raised in a forced manner, the particulate matter deposited on the filter 4 can be oxidized and removed. For example, the temperature of the filter 4 can be raised by supplying HC to the three-way catalyst 3. In addition, instead of providing with the three-way catalyst 3, provision may also be made for other devices which serve to raise the temperature of the filter 4. Moreover, the temperature of the filter 4 may also be raised by causing hot gas to be discharged from the internal combustion engine 1.

In addition, the NSR catalyst 5 has a function of occluding or storing NOx contained in the incoming exhaust gas when the oxygen concentration of the exhaust gas is high, and of reducing the occluded or stored NOx when the oxygen concentration of the incoming exhaust gas becomes low and when the reducing agent exists. For the reducing agent to be supplied to the NSR catalyst 5, there can be used HC or CO which is the unburnt fuel discharged from the internal combustion engine 1.

Here, note that when the exhaust gas passes through the three-way catalyst 3 or the NSR catalyst 5, the NOx in the exhaust gas may react with HC or $H_2$ to generate ammonia ($NH_3$). Then, in the embodiments, the three-way catalyst 3 or the NSR catalyst 5 corresponds to an $NH_3$ generation catalyst in the present invention. As the $NH_3$ generation catalyst, either one of the three-way catalyst 3 and the NSR catalyst 5 need only be provided. Here, note that in the embodiments, the three-way catalyst 3 or the NSR catalyst 5 is used as the $NH_3$ generation catalyst, but instead of this, other catalysts may be used which are able to generate $NH_3$.

The SCR catalyst 6 has a function of adsorbing or storing the reducing agent, and carrying out selective reduction of NOx by means of the reducing agent thus adsorbed or stored at the time when the NOx passes through the SCR catalyst 6. For the reducing agent to be supplied to the SCR catalyst 6, there can be used the $NH_3$ which is generated by the three-way catalyst 3 or the NSR catalyst 5.

Moreover, a first temperature sensor 11 for detecting the temperature of the exhaust gas and an air fuel ratio sensor 12 for detecting the air fuel ratio of the exhaust gas are mounted on the exhaust passage 2 at locations downstream of the three-way catalyst 3 and upstream of the filter 4. Here, note that the temperature of the three-way catalyst 3 or the temperature of the filter 4 can be measured by the first temperature sensor 11. Also, the air fuel ratio of the exhaust gas from the internal combustion engine 1 or the air fuel ratio of the exhaust gas flowing into the filter 4 can be detected by the air fuel ratio sensor 12.

Further, a second temperature sensor 13 for detecting the temperature of the exhaust gas and an NOx sensor 14 for detecting the concentration of NOx in the exhaust gas are mounted on the exhaust passage 2 at locations downstream of the NSR catalyst 5 and upstream of the SCR catalyst 6. Here, note that the temperature of the NSR catalyst 5 or the temperature of the SCR catalyst 6 can be detected by the second temperature sensor 13. Also, the concentration of NOx or the concentration of $NH_3$ in the exhaust gas flowing into the SCR catalyst 6 can be detected by means of the NOx sensor 14. In addition, based on the concentration of $NH_3$ detected by the NOx sensor 14, an amount of $NH_3$, which is adsorbed by the SCR catalyst 6, can also be calculated.

Here, note that it is not necessary to mount all the above-mentioned sensors, but some of them may be selected and mounted in a suitable manner.

In addition, on the exhaust passage 2, there is mounted a differential pressure sensor 15 which serves to detect a difference between the pressure therein upstream of the filter 4 and the pressure therein downstream of the filter 4. By means of this differential pressure sensor 15, it is possible to detect an amount of PM which has been trapped by the filter 4.

Moreover, on the internal combustion engine 1, there is mounted a fuel injection valve 7 for supplying fuel to the internal combustion engine 1.

On the other hand, an intake passage 8 is connected to the internal combustion engine 1. A throttle valve 9 for regulating an amount of intake air in the internal combustion engine 1 is arranged in the middle of the intake passage 8. Also, an air flow meter 16 for detecting the amount of intake air in the internal combustion engine 1 is mounted on the intake passage 8 at a location upstream of the throttle valve 9.

In the internal combustion engine 1 constructed as stated above, there is arranged in combination therewith an ECU 10 which is an electronic control unit for controlling the internal combustion engine 1. This ECU 10 controls the internal combustion engine 1 in accordance with the operating conditions of the internal combustion engine 1 and/or driver's requirements.

Further, besides the above-mentioned sensors, an accelerator opening sensor 18, which serves to detect an engine load by outputting an electrical signal corresponding to an amount of depression by which a driver depressed an accelerator pedal 17, and a crank position sensor 19, which serves to detect the number of revolutions per unit time of the engine, are connected to the ECU 10 through electrical wiring, and the output signals of these variety of kinds of sensors are inputted to the ECU 10.

On the other hand. the injection valve 7 and the throttle valve 9 are connected to the ECU 10 through electrical wiring, so that the opening and closing timing of the injection valve 7 and the degree of opening of the throttle valve 9 are controlled by means of the ECU 10.

For example, the ECU 10 decides a required amount of intake air from the accelerator opening degree detected by the accelerator opening sensor 18, and the number of engine revolutions per unit time detected by the crank position sensor 19. Then, the degree of opening of the throttle valve 9 is controlled according to the required amount of intake air. The injection valve 7 is controlled in such a manner as to supply an amount of fuel injection in accordance with the amount of intake air which changes at this time. The air fuel ratio set at this time is hereinafter referred to as an ordinary air fuel ratio. The word "ordinary" can mean the time in which rich spike control to be described later, the regeneration of the filter 4 and the generation of $NH_3$ are not carried out. This ordinary air fuel ratio is an air fuel ratio which is set according to the operating state of the internal combustion engine 1. In addition, in the internal combustion engine 1 according to the embodiments, a lean burn operation is carried out, and hence, the ordinary air fuel ratio is a lean air fuel ratio (e.g., 18).

In addition, the ECU 10 carries out a reduction treatment for the NOx stored in the NSR catalyst 5. At the time of reducing the NOx stored in the NSR catalyst 5, so-called rich spike control is carried out in which the air fuel ratio of the exhaust gas flowing into the NSR catalyst 5 is caused to decrease to a predetermined rich air fuel ratio by regulating the amount of fuel to be injected from the injection valve 7 or the degree of opening of the throttle valve 9. At this time, the amount of intake air or the amount of fuel injection is adjusted so that the air fuel ratio of the exhaust gas becomes in the vicinity of, for example, 12.5.

This rich spike control is carried out in cases where the amount of NOx stored in the NSR catalyst 5 becomes a predetermined amount. The amount of NOx stored in the NSR catalyst 4 is calculated, for example, by integrating a difference between an amount of NOx flowing into the NSR catalyst 5 and an amount of NOx flowing out of the NSR catalyst 5. The amount of NOx flowing into the NSR catalyst 5 and the amount of NOx flowing out of the NSR catalyst 5 can be detected, for example, by provision of sensors. In addition, the rich spike control may be carried out at every predetermined period of time or at every predetermined distance of travel.

Moreover, the ECU 10 carries out the regeneration of the filter 4 in which the PM trapped in the filter 4 is removed. In this regeneration of the filter 4, the temperature of the filter 4 is caused to rise to a temperature at which PM is oxidized, and thereafter, the air fuel ratio of the exhaust gas is regulated to be a predetermined lean air fuel ratio. Here, note that in the embodiments, the ECU 10, which carries out the regeneration of the filter 4, corresponds to a regeneration unit in the present invention.

The regeneration of the filter 4 is carried out when the amount of the PM trapped in the filter 4 becomes equal to or greater than a threshold value. The amount of the PM trapped in the filter 4 can be detected by means of the differential pressure sensor 15. In addition, the amount of the PM flowing into the filter 4, the engine load and the number of engine revolutions per unit time are in a correlation, and so, the amount of PM calculated from the number of engine revolutions per unit time and the engine load may be integrated, and when an integrated value thus obtained reaches a predetermined amount, the regeneration of the filter 4 may be carried out. Moreover, the regeneration of the filter 4 may be carried out, each time a predetermined distance is traveled.

However, at the time of the regeneration of the filter 4, the temperature of the exhaust gas flowing through the filter 4 is caused to rise, for example, from 500 degrees C. to 600 degrees C. In addition, at the time of the regeneration of the filter 4, the concentration of oxygen in the exhaust gas is made high by making the air fuel ratio of the exhaust gas to be the predetermined lean air fuel ratio. In such a condition, the purification (removal or reduction) rate of NOx in the three-way catalyst 3 decreases. Moreover, in the NSR catalyst 5, too, the NOx storage ability thereof decreases. On the other hand, the SCR catalyst 6 is arranged away from the filter 4. For this reason, even at the time of the regeneration of the filter 4, the temperature of the exhaust gas flowing into the SCR catalyst 6 is relatively low, so NOx purification (removal or reduction) performance is maintained high in the SCR catalyst 6. However, it is difficult to generate $NH_3$ at the time of the regeneration of the filter 4.

Accordingly, in the embodiments, $NH_3$ has been made to adsorb to the SCR catalyst 6 before the regeneration of the filter 4, so that NOx is removed or reduced mainly in the SCR catalyst 6 at the time of the regeneration of the filter 4. That is, the ECU 10 inhibits the regeneration of the filter 4 until the generation of $NH_3$ is completed. In order to cause $NH_3$ to be adsorbed to the SCR catalyst 6, the air fuel ratio of the exhaust gas is made equal to or less than the stoichiometric air fuel ratio. For example, the air fuel ratio of the exhaust gas may also be made to be a value which is slightly richer than the stoichiometric air fuel ratio. The air fuel ratio set at this time is from 13.5 to 14.5, for example, and is an air fuel ratio suitable for the generation of $NH_3$. This air fuel ratio is higher than an air fuel ratio (e.g., 12.5) suitable for the reduction of NOx. For example, when the CO in the exhaust gas changes into $H_2$ by a water gas shift reaction or steam reforming reaction, the $H_2$ can react with NO thereby to generate $NH_3$. Then, the air fuel ratio of the exhaust gas may be regulated to a value in a predetermined range including an air fuel ratio at which the largest amount of $NH_3$ is generated. This predetermined range can be obtained in advance through experiments, etc., as an air fuel ratio range in which large amounts of $NH_3$ are generated.

The $NH_3$ generated in this manner has been made to adsorb to the SCR catalyst 6. With this, the NOx discharged from the internal combustion engine 1 at the time of the regeneration of the filter 4 can be removed or reduced in the SCR catalyst 6.

Figure 2:
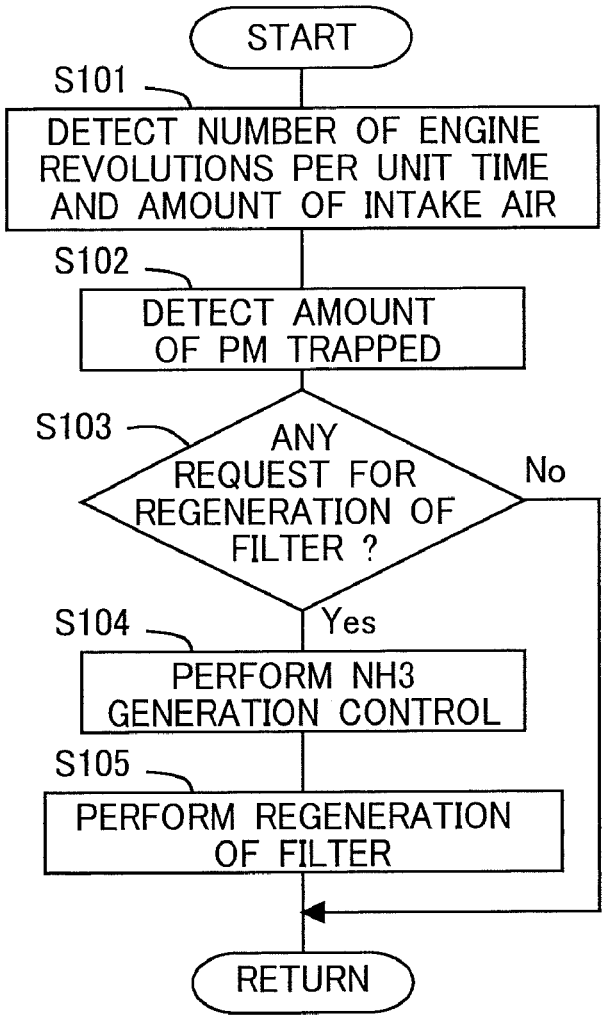
FIG. 2 is a flow chart showing a flow for NOx removal or reduction control at the time of regeneration of a filter according to a first embodiment.

FIG. 2 is a flow chart showing a flow or routine for NOx removal or reduction control at the time of the regeneration of the filter 4 according to this first embodiment. This routine is carried out by means of the ECU 10 at each predetermined time interval.

In step S101, the number of engine revolutions per unit time and the amount of intake air are obtained. In this step, values required for calculating an operating region of the internal combustion engine 1 are obtained. The number of engine revolutions per unit time is obtained by the crank position sensor 19. In addition, the amount of intake air is obtained by the air flow meter 16. In this connection, note that in place of the amount of intake air, other physical quantities may be detected which are in correlation with the road of the internal combustion engine 1.

In step S102, the amount of the PM trapped in the filter 4 is detected. This amount of the PM can be obtained by means of the differential pressure sensor 15.

In step S103, it is determined whether there is any request for carrying out the regeneration of the filter 4. In this step, it may be determined whether the regeneration of the filter 4 is to be carried out. The regeneration of the filter 4 is carried out when the amount of the PM trapped in the filter 4 is equal to or greater than a threshold value. This threshold value has been beforehand obtained through experiments or the like as a value at which the regeneration of the catalyst 3 becomes necessary. Here, note that it may be further determined whether the operating region of the internal combustion engine 1 is an operation region suitable for the regeneration of the filter 4.

In cases where an affirmative determination is made in step S103, the flow goes to step S104, whereas in cases where a negative determination is made, this routine is ended, without carrying out the regeneration of the filter 4.

In step S104, $NH_3$ generation control, which is the control for generating $NH_3$, is carried out. The $NH_3$ generation control is carried out by making the air fuel ratio of the exhaust gas equal to or less than the stoichiometric air fuel ratio (e.g., an air fuel ratio between 13.5 and 14.5). As a result of this, $NH_3$ as the reducing agent is adsorbed to the SCR catalyst 6. Here, note that in this embodiment, the ECU 10, which carries out the processing of step S104, corresponds to a generation unit in the present invention. Then, when the generation of $NH_3$ is completed, the flow goes to step S105.

In step S105, the regeneration of the filter 4 is carried out. The regeneration of the filter 4 is carried out by regulating the air fuel ratio of the exhaust gas to lean value, after causing the temperature of the filter 4 to go up to a high temperature. The NOx discharged from the internal combustion engine 1 during this period of time is removed or reduced by the SCR catalyst 6. Here, note that in this embodiment, the ECU 10, which carries out the processing of step S105, corresponds to the regeneration unit in the present invention.

In this manner, before carrying out the regeneration of the filter 4, $NH_3$ can have been made to adsorb to the SCR catalyst 6. For this reason, NOx can be removed or reduced even at the time of the regeneration of the filter 4.

Here, note that a period of time to carry out the $NH_3$ generation control may be a prescribed period of time, but it may be decided as follows.

For example, the $NH_3$ generation control may be carried out until the SCR catalyst 6 adsorbs an amount of $NH_3$ required for removing or reducing the NOx to be discharged from the internal combustion engine 1 when the regeneration of the filter 4 is carried out.

That is, the amount of $NH_3$ required at the time of the regeneration of the filter 4 has been generated in advance, so that the $NH_3$ does not run short when the regeneration of the filter 4 is being carried out. This can be said that an amount of $NH_3$ equal to or greater than an amount of $NH_3$ to be consumed until the regeneration of the filter 4 is completed has been made to adsorb to the SCR catalyst 6 in advance.

The amount of NOx to be discharged from the internal combustion engine 1 can be estimated by, for example, assuming that the operating state of the internal combustion engine 1 at the current point in time continues. That is, there is a correlation between the operating state of the internal combustion engine 1 and the amount of NOx to be discharged therefrom per unit time, and hence, it is possible to estimate the amount of NOx to be discharged from the internal combustion engine 1 per unit time, based on the operating state of the internal combustion engine 1. In addition, the amount of NOx to be discharged from the internal combustion engine 1 per unit time may have been obtained through experiments, etc. In this case, there may be used a value at the time when the internal combustion engine 1 is in an operating state where the amount of NOx to be discharged from the internal combustion engine 1 is the largest.

Further, the period of time to carry out the regeneration of the filter 4 changes in accordance with the amount of the PM trapped in the filter 4. Accordingly, the period of time of the regeneration of the filter 4 can be calculated based on the amount of the PM trapped in the filter 4. Then, a total amount of NOx to be discharged from the internal combustion engine 1 during the regeneration of the filter 4 can be calculated by multiplying this period of time of the regeneration of the filter 4 by the amount of NOx to be discharged per unit time. Thus, the required amount of $NH_3$ is also decided according to the total amount of NOx to be discharged from the internal combustion engine 1.

Here, note that the amount of $NH_3$ having adsorbed to the SCR catalyst 6 may be considered to be equal to the amount of $NH_3$ to be generated. In addition, even in the course of making $NH_3$ to be adsorbed, $NH_3$ is consumed by NOx, so this $NH_3$ thus consumed may also be taken into consideration. Moreover, the amount of adsorption of $NH_3$ also changes with the purification (removal or reduction) performance of the SCR catalyst 6, and hence, this purification performance may also be taken into consideration.

In addition, the $NH_3$ generation control may be carried out only for a period of time in which the largest amount of $NH_3$, which is able to be adsorbed to the SCR catalyst 6, is generated.

Figure 3:
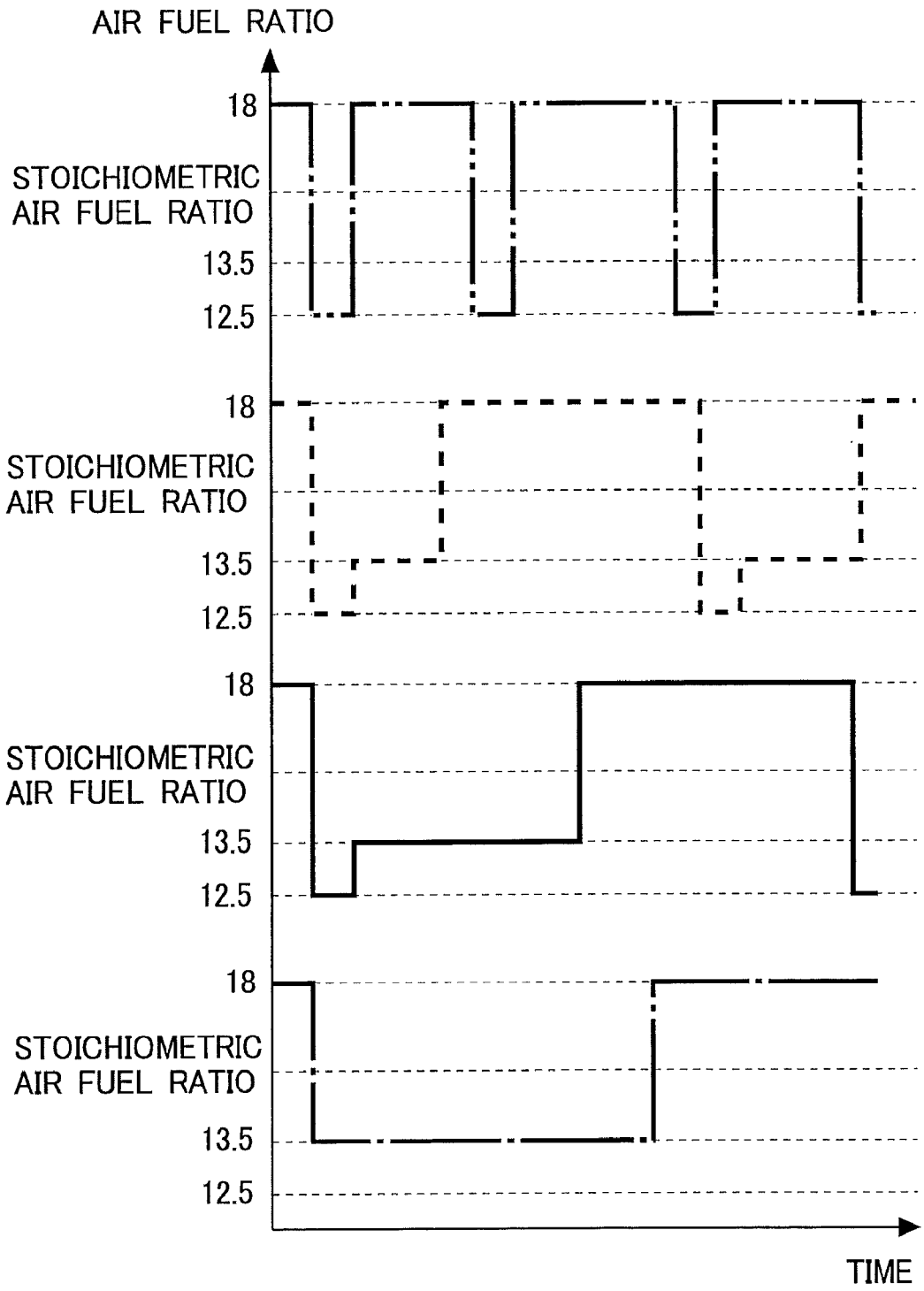
FIG. 3 is a view showing the change over time of an air fuel ratio of an exhaust gas when the air fuel ratio is made equal to or less than a stoichiometric air fuel ratio.

Here, FIG. 3 is a view showing the change over time of the air fuel ratio of the exhaust gas when the air fuel ratio is made equal to or less than the stoichiometric air fuel ratio. A solid line indicates a first example in the case of carrying out $NH_3$ generation control according to this embodiment; an alternate long and short dash line indicates a second example in the case of carrying out $NH_3$ generation control according to this embodiment; an alternate long and two short dashes line indicates a case where general rich spike control for the reduction of NOx is carried out; and a broken line indicates a case where $NH_3$ is supplied to the SCR catalyst 6, at the time when the regeneration of the filter 4 is not carried out.

As shown by the alternate long and two short dashes line in FIG. 3, in cases where general rich spike control for the reduction of NOx is carried out, there is no need to generate $NH_3$, as a result of which the air fuel ratio of the exhaust gas is set to an air fuel ratio (e.g., 12.5) suitable for the reduction of NOx. In addition, as shown by the broken line in FIG. 3, in cases where the $NH_3$ generation control according to this embodiment is not carried out, the air fuel ratio of the exhaust gas is set to an air fuel ratio (e.g., 12.5) suitable for the reduction of NOx, and after the reduction of NOx is completed, the air fuel ratio of the exhaust gas is set to an air fuel ratio (e.g., 13.5) suitable for the generation of $NH_3$. Then, the duration of the air fuel ratio (e.g., 13.5) to be set for the generation of $NH_3$ in the NSR catalyst 5 is relatively short. That is, if $NH_3$ runs short, $NH_3$ can be immediately generated, so the duration of the air fuel ratio (e.g., 13.5) to be set for the generation of $NH_3$ is short.

On the other hand, as shown by the solid line in FIG. 3, in the first example in which the $NH_3$ generation control according to this embodiment is carried out, the air fuel ratio of the exhaust gas is set to an air fuel ratio (e.g., 12.5) suitable for the reduction of NOx, and after the reduction of NOx is completed, the air fuel ratio of the exhaust gas is set to an air fuel ratio (e.g., 13.5) suitable for the generation of $NH_3$. Then, by making relatively long the duration of the air fuel ratio (e.g., 13.5) to be set for the generation of $NH_3$ in the NSR catalyst 5, the amount of generation of $NH_3$ is made to increase. The duration of the air fuel ratio (e.g., 13.5) to be set for this generation of $NH_3$ may also be a period of time until the amount of $NH_3$ to be required at the time of the regeneration of the filter 4 is adsorbed to the SCR catalyst 6.

In addition, as shown by the alternate long and short dash line in FIG. 3, the air fuel ratio of the exhaust gas can be set to an air fuel ratio (e.g., 13.5) suitable for the generation of $NH_3$, without setting the air fuel ratio of the exhaust gas to an air fuel ratio (e.g., 12.5) suitable for the reduction of NOx. That is, $NH_3$ may be generated, without carrying out the rich spike control for the reduction of NOx. The duration of the air fuel ratio (e.g., 13.5) suitable for the generation of $NH_3$ may also be a period of time until the amount of $NH_3$ to be required at the time of the regeneration of the filter 4 is adsorbed to the SCR catalyst 6.

Second Embodiment

In this second embodiment, in cases where the amount of $NH_3$ having adsorbed by the SCR catalyst 6 runs short in the course of carrying out the regeneration of the filter 4, the regeneration of the filter 4 is interrupted. Then, after $NH_3$ is made to adsorb to the SCR catalyst 6, the regeneration of the filter 4 is resumed. The other devices and so on are the same as those in the first embodiment, so the explanation thereof is omitted.

In cases where $NH_3$ generation control is carried out before the regeneration of the filter 4, or in case where $NH_3$ has already been adsorbed to the SCR catalyst 6 to some extent before the regeneration of the filter 4, when the period of time to carry out the regeneration of the filter 4 becomes long, there will be a fear that $NH_3$ may run short in the SCR catalyst 6. Here, the more the amount of the PM having been trapped in the filter 4, the longer becomes the period of time required for the regeneration of the filter 4. For example, even if the regeneration of the filter 4 is carried out when the amount of the PM having been trapped in the filter 4 becomes equal to or greater than a threshold value, the regeneration of the filter 4 can not be started until the operating region of the internal combustion engine 1 becomes an operating region suitable for the regeneration of the filter 4. Then, if it takes time until the operating region of the internal combustion engine 1 becomes an operating region suitable for the regeneration of the filter 4, a large amount of PM will be trapped until the regeneration of the filter 4 is started.

In addition, there is a limitation on the amount of $NH_3$ which can be adsorbed to the SCR catalyst 6, and besides, it is difficult to generate $NH_3$ at the time of the regeneration of the filter 4. From these, it can also be considered that the $NH_3$ having been adsorbed to the SCR catalyst 6 is used up during the regeneration of the filter 4. In that case, it thereafter becomes difficult to remove or reduce NOx.

In contrast to this, in this embodiment, in cases where the amount of $NH_3$ having been adsorbed to the SCR catalyst 6 has become equal to or less than a predetermined value, the regeneration of the filter 4 is interrupted. The predetermined value referred to herein is an upper limit value of the amount of adsorption at which it becomes unable to reduce NOx at the time of the regeneration of the filter 4. Here, note that the predetermined value may also be 0. That is, when the $NH_3$ having been adsorbed by the SCR catalyst 6 has been used up, the regeneration of the filter 4 may also be interrupted. For example, a sensor for detecting NOx may be arranged at a location downstream of the SCR catalyst 6, so that in cases where NOx is detected during the regeneration of the filter 4, it may be judged that $NH_3$ is not adsorbed to the SCR catalyst 6, and the regeneration of the filter 4 may be interrupted. In addition, in cases where a total amount of NOx estimated to be discharged at the time of the regeneration of the filter 4 is larger than the amount of NOx which is able to be removed or reduced by the $NH_3$ having been adsorbed by the SCR catalyst 6, the regeneration of the filter 4 may be interrupted.

Moreover, in cases where it can be predicted that the $NH_3$ having been adsorbed by the SCR catalyst 6 will be used up, the regeneration of the filter 4 may also be interrupted. The amount of $NH_3$ having been absorbed to the SCR catalyst 6 can be calculated based on the amount of NOx having flown into the SCR catalyst 6. In this case. the amount of NOx having flown into the SCR catalyst 6 may be a value which has been estimated from the operating state of the internal combustion engine 1, or may be a value which has been detected by means of the NOx sensor 14.

Then, if $NH_3$ is caused to be generated at the time when the regeneration of the filter 4 is interrupted, the SCR catalyst 6 can adsorb the $NH_3$ again. In that case, when the regeneration of the filter 4 is resumed, it becomes possible to remove or reduce NOx.

A period of time to carry out $NH_3$ generation control when the regeneration of the filter 4 is interrupted may also be a prescribed period of time. In addition, it may also be a period of time in which an amount of $NH_3$, which is able to remove or reduce the total amount of NOx estimated to be discharged from the internal combustion engine 1 until the regeneration of the filter 4 is completed, is adsorbed to the SCR catalyst 6.

Figure 4:
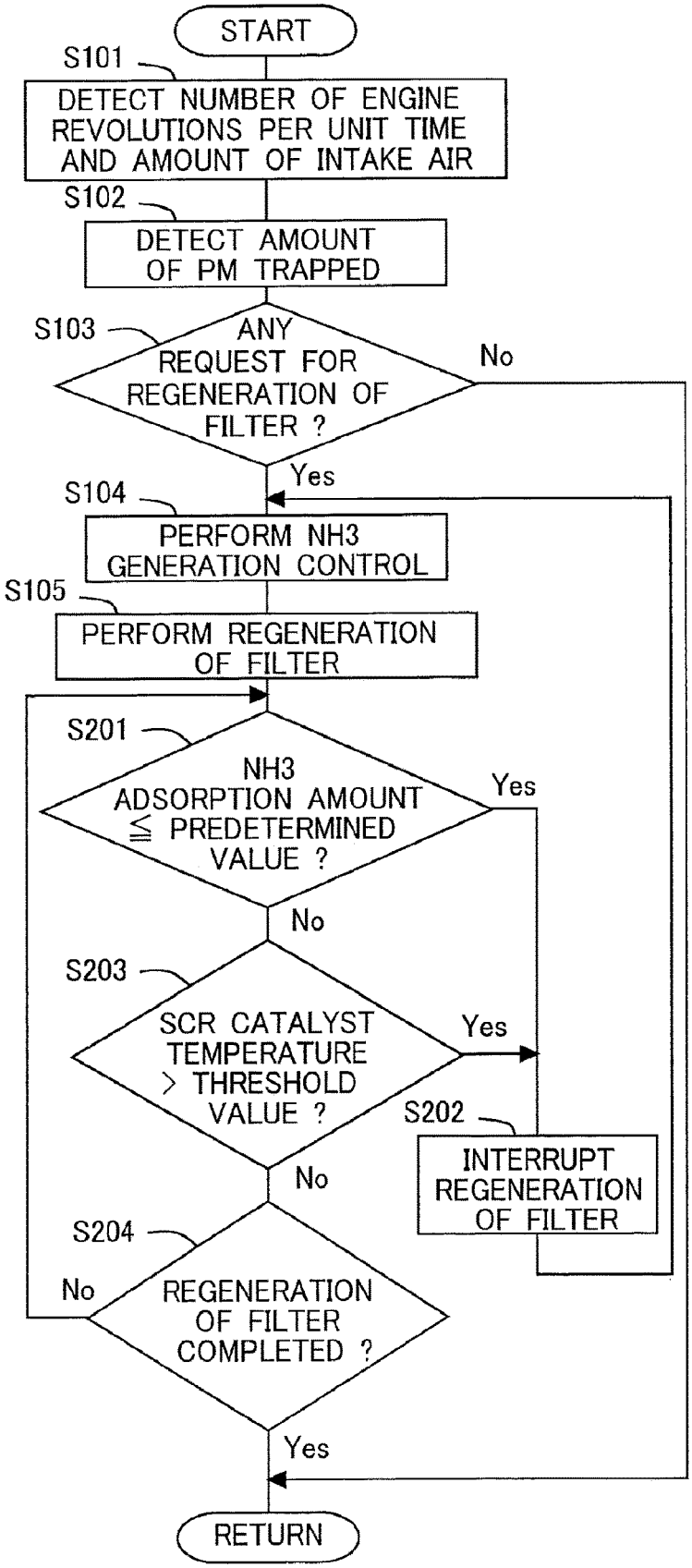
FIG. 4 is a flow chart showing a flow for NOx removal or reduction control at the time of regeneration of a filter according to a second embodiment.

FIG. 4 is a flow chart showing a flow or routine for NOx removal or reduction control at the time of the regeneration of the filter 4 according to this embodiment. This routine is carried out by means of the ECU 10 at each predetermined time interval. Here, note that for those steps in which the same processing as in the aforementioned flow chart is carried out, the same symbols are attached and an explanation thereof is omitted.

In step S201, it is determined whether the amount of $NH_3$ having been adsorbed by the SCR catalyst 6 (the amount of adsorption of $NH_3$) is equal to or less than a predetermined value. This predetermined value is an upper limit value of the amount of adsorption of $NH_3$ at which it becomes unable to remove or reduce NOx. Here, note that the predetermined value may also be 0. In this step, it may be determined whether the amount of $NH_3$ having been adsorbed by the SCR catalyst 6 has been used up. In this routine, as long as $NH_3$ remains in the SCR catalyst 6, the regeneration of the filter 4 is carried out, and when the remaining amount of $NH_3$ becomes equal to or less than the predetermined value during the regeneration of the filter 4, the regeneration of the filter 4 is interrupted.

In cases where an affirmative determination is made in step S201, the flow advances to step S202, where the regeneration of the filter 4 is interrupted. After that, the flow returns to step S104, where $NH_3$ is generated. On the other hand, in cases where a negative determination is made in step S201, the flow advances to step S203.

In step S203, it is determined whether the temperature of the SCR catalyst 6 is higher than a threshold value. This threshold value is an upper limit value of the temperature at which $NH_3$ can be adsorbed to the SCR catalyst 6. Here, when the period of time to carry out the regeneration of the filter 4 becomes long, the SCR catalyst 6 may become higher than as required. For this reason, there is a fear that the temperature of the SCR catalyst 6 may become higher than the threshold value, and the $NH_3$ having been adsorbed thereto may be released. Accordingly, in this step, it is determined whether the temperature of the SCR catalyst 6 has exceeded the temperature at which the SCR catalyst 6 is able to adsorb $NH_3$.

In cases where an affirmative determination is made in step S203, the flow goes to step S202, where the regeneration of the filter 4 is interrupted. On the other hand, in cases where a negative determination is made in step S203, the flow advances to step S204.

In step S204, it is determined whether the regeneration of the filter 4 has been completed. For example, when the amount of the PM detected by the differential pressure sensor 15 becomes less than the threshold value, a determination is made that the regeneration of the filter 4 has been completed. In addition, when a predetermined period of time has elapsed after starting the regeneration of the filter 4, a determination may be made that the regeneration of the filter 4 has been completed.

In cases where an affirmative determination is made in step S204, this routine is ended. On the other hand, in cases where a negative determination is made in step S204, the flow returns to step S201.

As described above, according to this embodiment, only when $NH_3$ has been adsorbed to the SCR catalyst 6, the regeneration of the filter 4 is carried out, thus making it possible to suppress the NOx from passing through the SCR catalyst 6 at the time of the regeneration of the filter 4.

Third Embodiment

In this third embodiment, an amount of accumulation or deposition of PM, which becomes a reference to carry out the regeneration of the filter 4 is made to change according to the amount of $NH_3$ having been absorbed to the SCR catalyst 6. That is, the threshold value in the above-mentioned step S103 is made to change according to the amount of $NH_3$ having been absorbed to the SCR catalyst 6. In addition, the threshold value in the above-mentioned step S103 may also be changed according to the amount of $NH_3$ which is able to be adsorbed as much as possible by the SCR catalyst 6. The other devices and so on are the same as those in the first embodiment, so the explanation thereof is omitted.

Here, the amount of NOx, which is able to be removed or reduced at the time of the regeneration of the filter 4, changes according to the amount of $NH_3$ having been absorbed to the SCR catalyst 6. As a result, a period of time, in which NOx is able to be removed or reduced at the time of the regeneration of the filter 4, changes according to the amount of $NH_3$ having been absorbed to the SCR catalyst 6. For example, the smaller the amount of $NH_3$ having been absorbed to the SCR catalyst 6, the shorter becomes the period of time in which NOx is able to be removed or reduced at the time of the regeneration of the filter 4. Accordingly, by carrying out the regeneration of the filter 4 within a range in which NOx is able to be removed or reduced, it is possible to suppress the NOx from passing through the SCR catalyst 6 at the time of the regeneration of the filter 4. In addition, the regeneration of the filter 4 can be carried out, as long as the removal or reduction of NOx is able to be carried out. In this case, the period of time of the regeneration of the filter 4 is limited according to the amount of $NH_3$ having been absorbed to the SCR catalyst 6. That is, the period of time in which the regeneration of the filter 4 can be carried out is made to change according to the amount of $NH_3$ having been absorbed to the SCR catalyst 6. Then, the period of time in which the regeneration of the filter 4 can be carried out is able to be decided according to the amount of $NH_3$ having been absorbed to the SCR catalyst 6.

Because there is a correlation between the period of time to carry out the regeneration of the filter 4 and the amount of the PM trapped in the filter 4, the amount of PM, which is able to be removed at the time of the regeneration of the filter 4, is decided according to the amount of $NH_3$ having been absorbed to the SCR catalyst 6. This amount of PM able to be removed is set as the threshold value in the above-mentioned step S103. That is, the threshold value in step S103 is made to change according to the amount of $NH_3$ having been absorbed to the SCR catalyst 6.

In addition, the threshold value in step S103 may also be a value corresponding to the amount of $NH_3$ which is able to be adsorbed to the SCR catalyst 6 as much as possible. This amount of $NH_3$ able to be adsorbed to the SCR catalyst 6 becomes smaller in accordance with the deterioration of the SCR catalyst 6.

Figure 5:
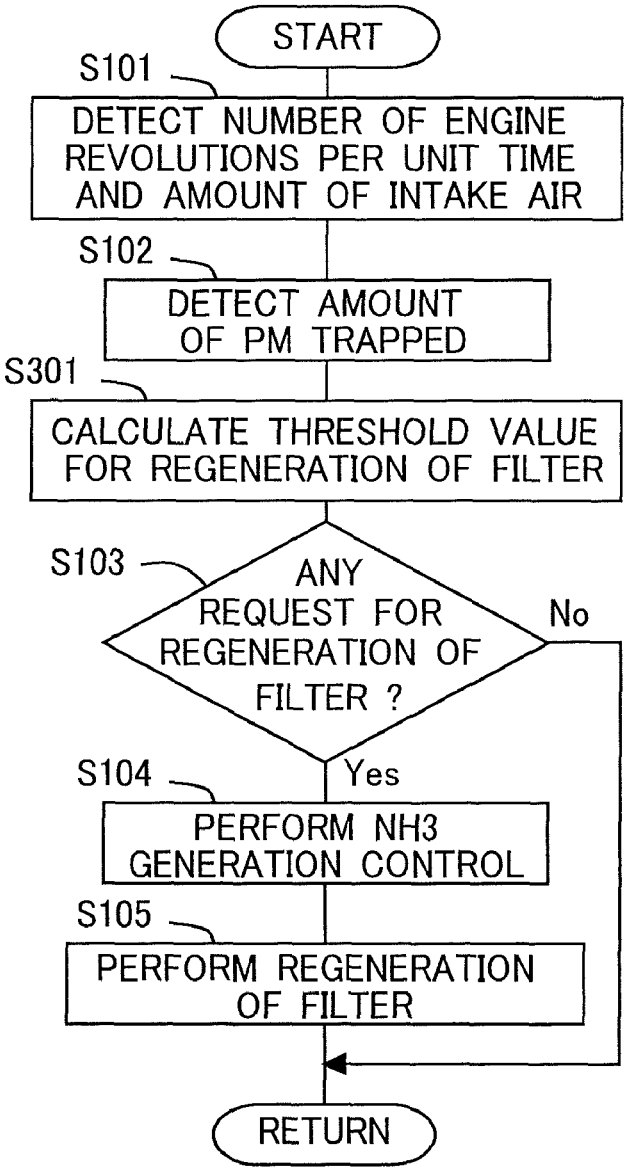
FIG. 5 is a flow chart showing a flow for NOx removal or reduction control at the time of regeneration of a filter according to a third embodiment.

FIG. 5 is a flow chart showing a flow or routine for NOx removal or reduction control at the time of the regeneration of the filter 4 according to this embodiment. This routine is carried out by means of the ECU 10 at each predetermined time interval. Here, note that for those steps in which the same processing as in the aforementioned flow chart is carried out, the same symbols are attached and an explanation thereof is omitted.

In this routine, step S301 is processed before step S103. In step S301, an amount of trapped PM, which becomes the threshold value of the regeneration of the filter 4 in step S103, is calculated. This amount of trapped PM is calculated based on the amount of $NH_3$ having been absorbed to the SCR catalyst 6.

In this step, first, the amount of $NH_3$ having been absorbed by the SCR catalyst 6 is calculated. This amount of $NH_3$ may have been obtained in advance through experiments, etc., as a value at the time when the SCR catalyst 6 has adsorbed the largest amount of $NH_3$. That is, the amount of $NH_3$ may also be set to a maximum value of the amount of $NH_3$ which can be adsorbed by the SCR catalyst 6. Here, note that other than during the regeneration of the filter 4, the reducing agent may be applied to the SCR catalyst 6 so that $NH_3$ has always been adsorbed to the SCR catalyst 6 as much as possible.

However, the largest amount of $NH_3$ able to be adsorbed by the SCR catalyst 6 decreases in accordance with the deterioration of the SCR catalyst 6. Accordingly, the largest amount of $NH_3$ able to be adsorbed by the SCR catalyst 6 may be made to decrease based on the extent of the deterioration of the SCR catalyst 6. In this case, the larger the extent of the deterioration of the SCR catalyst 6, the smaller becomes the threshold value in step S103, and hence, the shorter becomes the interval at which the regeneration of the filter 4 is carried out. Here, note that in the case where the SCR catalyst 6 has deteriorated, the threshold value may be made smaller than in the case where the SCR catalyst 6 has not deteriorated.

Then, the extent of the deterioration of the SCR catalyst 6 can be determined based on the $NH_3$ adsorption performance in the SCR catalyst 6, for example. For example, a sensor for detecting the concentration of $NH_3$ in the exhaust gas may be arranged at a location downstream of the SCR catalyst 6, so that such a determination (i.e., the extent of the deterioration of the SCR catalyst 6) can be made based on the amount of generation of $NH_3$ until $NH_3$ is detected by the sensor, when the $NH_3$ has been made to generate. This amount of generation of $NH_3$ becomes the largest amount of $NH_3$ able to be adsorbed by the SCR catalyst 6. In addition, the extent of the deterioration of the SCR catalyst 6 can also be determined in accordance with the history of the temperature of the SCR catalyst 6. Moreover, the extent of the deterioration of the SCR catalyst 6 may also be determined, for example, by detecting the concentrations of NOx at the upstream side and at the downstream side of the SCR catalyst 6 by the use of sensors, and calculating the removal or reduction rate of NOx from the decreasing rate of the concentration of NOx at the time when the exhaust gas passes through the SCR catalyst 6. Further, the extent of the deterioration of the SCR catalyst 6 may also be determined by means of well-known technologies.

In addition, the amount of trapped PM, which becomes the threshold value for the regeneration of the filter 4, may be calculated based on the amount of $NH_3$ having been absorbed by the SCR catalyst 6. There is a correlation between the amount of $NH_3$ having been absorbed by the SCR catalyst 6 and the amount of trapped PM, which becomes the threshold value for the regeneration of the filter 4. If this relation has beforehand been obtained through experiments, etc., the amount of trapped PM, which becomes the threshold value for the regeneration of the filter 4, can be calculated based on the amount of $NH_3$ having been absorbed by the SCR catalyst 6. Then, based on this threshold value, it is determined in step S103 whether there is any request for carrying out the regeneration of the filter 4.

As described above, according to this embodiment, the amount of trapped PM, which becomes the threshold value for carrying out the regeneration of the filter 4, is set in accordance with the amount of $NH_3$ having been absorbed by the SCR catalyst 6, as a result of which it is possible to suppress the $NH_3$ from running short in the course of the regeneration of the filter 4.

Fourth Embodiment

In this fourth embodiment, in cases where a determination is made that the SCR catalyst 6 has deteriorated, the $NH_3$ generation control and the regeneration of the filter 4 are carried out, even if the amount of the PM having been trapped in the filter 4 is less than the threshold value. That is, in cases where the SCR catalyst 6 has deteriorated, the interval at which the regeneration of the filter 4 is carried out is made short. The other devices and so on are the same as those in the first embodiment, so the explanation thereof is omitted.

Here, when the extent of the deterioration of the SCR catalyst 6 exceeds an allowable range, a determination may be made that the SCR catalyst 6 has deteriorated. For example, when the largest amount of $NH_3$ able to be adsorbed by the SCR catalyst 6 becomes equal to or less than the threshold value, the determination can be made that the SCR catalyst 6 has deteriorated. In addition, for example, the removal or reduction rate of NOx in the SCR catalyst 6 may be calculated, and when this removal or reduction rate of NOx becomes equal to or less than a threshold value, a determination may be made that the adsorbent 5 has deteriorated.

In cases where the SCR catalyst 6 has not deteriorated, the regeneration of the filter 4 is carried out at the time when the amount of the PM having been trapped in the filter 4 is equal to or larger than the threshold value. On the other hand, in cases where the SCR catalyst 6 has deteriorated, the regeneration of the filter 4 is carried out even when the amount of the PM having been trapped in the filter 4 is less than the threshold value.

Here, note that in the case where the SCR catalyst 6 has deteriorated, the period of time of the regeneration of the filter 4 is made shorter than in the case where the SCR catalyst 6 has not deteriorated. That is, in the case where the SCR catalyst 6 has deteriorated, the amount of $NH_3$ having been absorbed by the SCR catalyst 6 becomes small, so the amount of NOx able to be removed or reduced also becomes small. According to this, the period of time of the regeneration of the filter 4 is made short. On the other hand, in cases where the SCR catalyst 6 has deteriorated, the regeneration of the filter 4 is carried out in a state where the amount of the PM having been trapped in the filter 4 is small, as a result of which the period of time of the regeneration of the filter 4 becomes short. Here, note that the larger the extent of deterioration of the SCR catalyst 6, the shorter the interval at which the regeneration of the filter 4 is carried out may be made, and at the same time, the period of time of the regeneration of the filter 4 may be interrupted.

Figure 6:
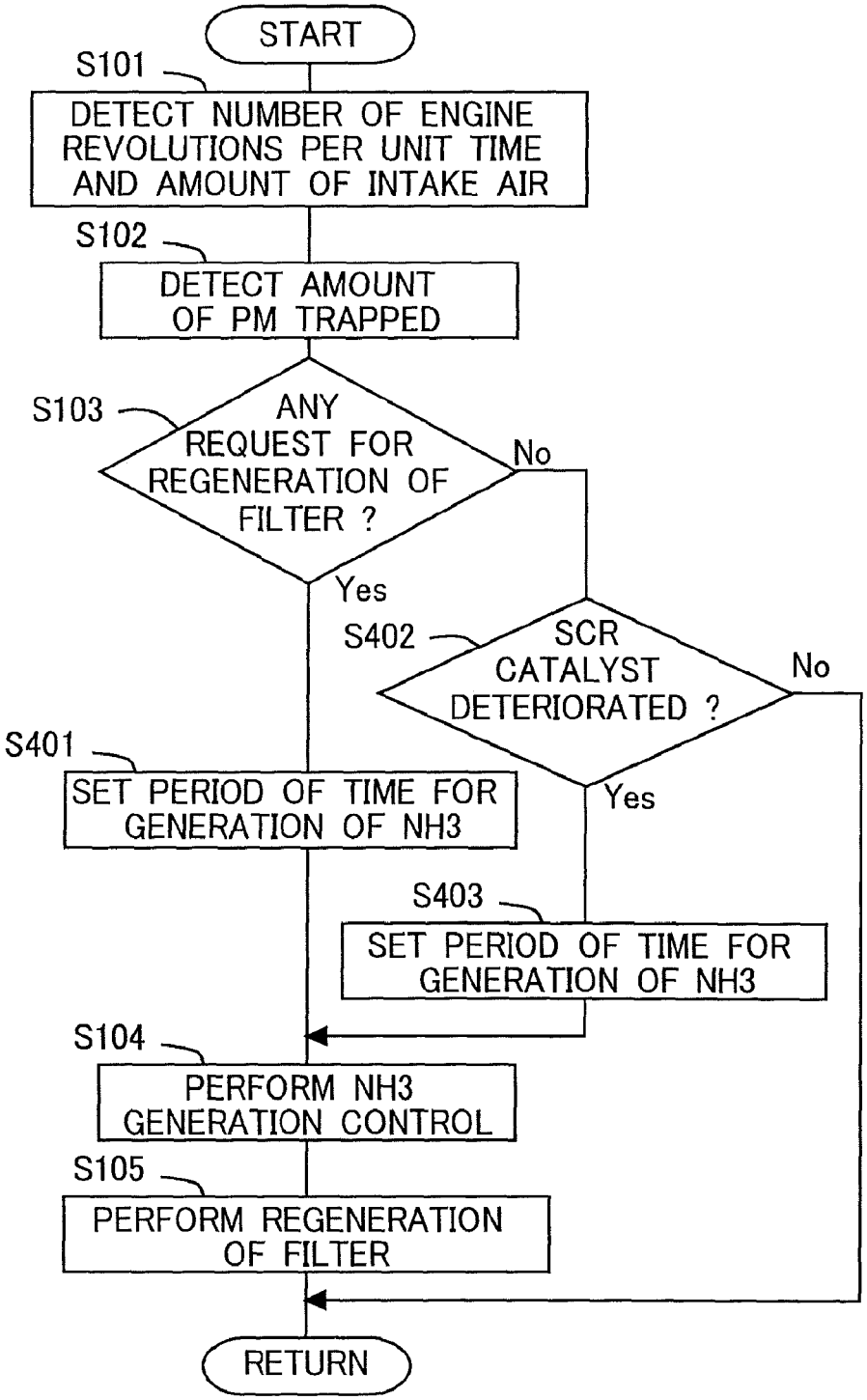
FIG. 6 is a flow chart showing a flow for NOx removal or reduction control at the time of regeneration of a filter according to a fourth embodiment.

FIG. 6 is a flow chart showing a flow or routine for NOx removal or reduction control at the time of the regeneration of the filter 4 according to this embodiment. This routine is carried out by means of the ECU 10 at each predetermined time interval. Here, note that for those steps in which the same processing as in the aforementioned flow chart is carried out, the same symbols are attached and an explanation thereof is omitted.

In cases where an affirmative determination is made in step S103, the flow advances to step S401. In step S401, the period of time to carry out the $NH_3$ generation control is set. At this time, the amount of the PM having been trapped in the filter 4 is large, so it is necessary to generate a large amount of $NH_3$. In addition, it is considered that a determination has been made in the last routine that the SCR catalyst 6 has not deteriorated, so the SCR catalyst 6 can adsorb a large amount of $NH_3$. From the above, in this step, the period of time to carry out $NH_3$ generation control is set to a relatively long period of time. This period of time may also be set as a prescribed value which has been stored in the ECU 10 in advance. Then, the flow goes to step S104, where the $NH_3$ generation control is carried out only for the period of time set in step S401.

On the other hand, in cases where a negative determination is made in step S103, the flow advances to step S402. In step S402, it is determined whether the SCR catalyst 6 has deteriorated. Here, it may be determined whether the SCR catalyst 6 has deteriorated, as described above, but in simple, when the operation time of the internal combustion engine 1 is equal to or greater than a predetermined period of time, a determination may also be made that the SCR catalyst 6 has deteriorated. In addition, it may also be determined that the longer the operation time of the internal combustion engine, the larger is the extent of the deterioration of the SCR catalyst 6. Moreover, when the distance of travel of the vehicle is equal to or more than a predetermined travel distance, a determination may also be made that the SCR catalyst 6 has deteriorated. Further, it may also be determined that the longer the distance of travel of the vehicle, the larger is the extent of the deterioration of the SCR catalyst 6. Furthermore, when the integrated value of the temperature of the exhaust gas is equal to or more than a predetermined value, a determination may also be made that the SCR catalyst 6 has deteriorated. Still further, it may also be determined that the larger the integrated value of the temperature of the exhaust gas, the larger is the extent of the deterioration of the SCR catalyst 6.

In cases where an affirmative determination is made in step S402, the flow advances to step S403. In step S403, the period of time to carry out the $NH_3$ generation control is set. At this time, the amount of the PM having been trapped in the filter 4 is small, so the amount of $NH_3$ to be generated need only be small. In addition, the SCR catalyst 6 has deteriorated, so the amount of $NH_3$ able to be adsorbed to the SCR catalyst 6 is small. From the above, in this step, the period of time to carry out the $NH_3$ generation control is set to a relatively short period of time. This period of time is shorter than the period of time set in step S401. This period of time may also be set as a prescribed value which has been stored in the ECU 10 in advance. Moreover, the period of time to carry out the $NH_3$ generation control may also be made shorter according to the extent of the deterioration of the SCR catalyst. Then, the flow goes to step S104, where the $NH_3$ generation control is carried out only for the period of time set in step S403.

On the other hand, in cases where a negative determination is made in step S402, there is no need to carry out the regeneration of the filter 4, and hence, this routine is ended.

As described above, according to this embodiment, when the filter 4 has deteriorated, the interval to carry out the regeneration of the filter 4 becomes shorter and at the same time the period of time of the regeneration of the filter 4 becomes shorter, than when the filter 4 has not deteriorated. That is, even if the filter 4 has deteriorated and the amount of $NH_3$ able to be absorbed to the filter 4 has decreased, the interval of the regeneration of the filter 4 and the period of time of the regeneration of the filter 4 are adjusted according thereto, thus making it possible to suppress the $NH_3$ from running short in the SCR catalyst 6. As a result of this, it is possible to suppress a decrease in the removal or reduction rate of NOx.

EXPLANATION OF REFERENCE NUMERALS AND CHARACTERS

1 internal combustion engine
2 exhaust passage
3 three-way catalyst
4 filter
5 NOx storage reduction catalyst (NSR catalyst)
6 NOx selective reduction catalyst (SCR catalyst)
7 injection valve
8 intake passage
9 throttle valve
10 ECU
11 first temperature sensor
12 air fuel ratio sensor
13 second temperature sensor
14 NOx sensor
15 differential pressure sensor
16 air flow meter
17 accelerator pedal
18 accelerator opening sensor
19 crank position sensor

The invention claimed is:

1. An exhaust gas purification apparatus of an internal combustion engine comprising:

an NOx selective reduction catalyst that is arranged in an exhaust passage of the internal combustion engine and reduces NOx by using NH3 as a reducing agent;

a filter that is arranged in the exhaust passage at the upstream side of said NOx selective reduction catalyst and traps particulate matter contained in the exhaust gas;

an NH3 generation catalyst that is arranged in the exhaust passage at the upstream side of said NOx selective reduction catalyst and generates NH3 when the air fuel ratio of the exhaust gas is equal to or less than a stoichiometric air fuel ratio; *and*

*an electronic control unit (ECU), wherein*

*the ECU is configured to*

[a regeneration unit that regenerates] *regenerate* said filter by supplying oxygen to said filter while raising the temperature of said filter; and

[a generation unit that makes] *make* the air fuel ratio of the exhaust gas equal to or less than the stoichiometric air fuel ratio, thereby causing NH3 to be generated in said NH3 generation catalyst;

[wherein said regeneration unit inhibits] *inhibit* the regeneration of said filter until [the generation of NH3 by said generation unit is completed] *an amount of NH3 required for the regeneration of the filter is adsorbed to the NOx selective reduction catalyst*; and

[said generation unit does] not carry out the generation of NH3 during the regeneration of said filter.

2. The exhaust gas purification apparatus for an internal combustion engine as set forth in claim 1, wherein *the ECU is further configured to*

[said generation unit causes] *cause* NH3 to be generated until said NOx selective reduction catalyst adsorbs an amount of NH3 required for removing NOx to be discharged from said internal combustion engine when the regeneration of said filter is carried out.

3. The exhaust gas purification apparatus for an internal combustion engine as set forth in claim 1, wherein in cases where the amount of NH3 having been adsorbed to said NOx selective reduction catalyst becomes equal to or less than a predetermined value when the regeneration of said filter is carried out, [said regeneration unit interrupts] *the ECU is further configured to interrupt* the regeneration of said filter.

4. The exhaust gas purification apparatus for an internal combustion engine as set forth in claim 3, wherein

[when said regeneration unit has interrupted the regeneration of said filter, said generation unit causes] *the ECU is further configured to cause* NH3 to be generated, by making the air fuel ratio of the exhaust gas equal to or less than the stoichiometric air fuel ratio *when interrupting the regeneration of said filter*.

5. The exhaust gas purification apparatus for an internal combustion engine as set forth in claim 3, wherein

[even if] *before* the regeneration of said filter is resumed, [said generation unit causes] *the ECU is further configured to cause* NH3 to be generated until said NOx selective reduction catalyst adsorbs an amount of NH3 so that the amount of NH3 adsorbed to said NOx selective reduction catalyst does not become equal to or less than said predetermined value[, at the time of carrying out the regeneration of said filter] *after the regeneration of the filter is restarted*; and even if the regeneration of said filter is resumed, [said regeneration unit resumes] *the ECU is further configured to resume* the regeneration of said filter after said NOx selective reduction catalyst has adsorbed an amount of NH3 so that the amount of NH3 adsorbed to said NOx selective reduction catalyst does not become equal to or less than said predetermined value, at the time of carrying out the regeneration of said filter.

6. The exhaust gas purification apparatus for an internal combustion engine as set forth in claim 1, wherein

[said regeneration unit] *the ECU is further configured to*

[starts] *start* the regeneration of said filter when an amount of particulate matter trapped in said filter becomes equal to or greater than a threshold value, and

[sets] *set* said threshold value in such a manner that the NOx to be discharged from said internal combustion engine in a period of time from when the regeneration of said filter is started until it is completed becomes able to be removed by the amount of NH3 having been adsorbed to said NOx selective reduction catalyst.

7. The exhaust gas purification apparatus for an internal combustion engine as set forth in claim 1, wherein the larger [the] *an* extent of [the] *a* deterioration of said NOx selective reduction catalyst, the shorter [said regeneration unit makes] *the ECU is further configured to make* the interval in which the regeneration of said filter is carried out.

[8. The exhaust gas purification apparatus for an internal combustion engine as set forth in claim 1, wherein said generation unit adjusts the air fuel ratio of the exhaust gas flowing into said NH3 generation catalyst to such a value that falls within a predetermined range including an air fuel ratio at which the amount of generation of NH3 becomes the largest.]

9. The exhaust gas purification apparatus for an internal combustion engine as set forth in claim 1, wherein at the time of carrying out the regeneration of said filter, [said regeneration unit interrupts] *the ECU is further configured to interrupt* the regeneration of said filter, in cases where the temperature of said NOx selective reduction catalyst becomes higher than a temperature able to adsorb NH3; and

[when said regeneration unit has interrupted the regeneration of said filter, said generation unit causes] *the ECU is further configured to cause* NH3 to be generated, by making the air fuel ratio of the exhaust gas equal to or less than the stoichiometric air fuel ratio *when interrupting the regeneration of said filter*.

*10. An exhaust gas purification apparatus of an internal combustion engine comprising:*

*an NOx selective reduction catalyst arranged in an exhaust passage of the internal combustion engine and which reduces NOx by using NH3 as a reducing agent:*

*a filter arranged in the exhaust passage at an upstream side of the NOx selective reduction catalyst and which traps particulate matter contained in the exhaust gas:*

*an NH3 generation catalyst arranged in the exhaust passage at the upstream side of the NOx selective reduction catalyst and which generates NH3 when the air fuel ratio of the exhaust gas is equal to or less than a stoichiometric air fuel ratio: and*

*a controller configured to:*

*perform a first control in which the air fuel ratio of the exhaust gas introduced into said NH3 generation catalyst is equal to or less than the stoichiometric air fuel ratio: and*

*after the first control, perform a second control in which oxygen is supplied to the filter while raising the temperature of the filter to regenerate the filter,*

*wherein the second control is performed when NH3 generated by the first control remains on the NOx selective reduction catalyst; and*

*the second control is performed while NH3 on the NOx selective reduction catalyst exceeds the amount of NH3 on the NOx selective reduction catalyst prior to performing the first control.*

*11. The exhaust gas purification apparatus of an internal combustion engine as set forth in claim 10, wherein during the first control, the temperature of the filter is raised from 500 degrees C. to 600 degrees C.*

*12. The exhaust gas purification apparatus of an internal combustion engine as set forth in claim 10, wherein the first control is performed until the NOx selective reduction catalyst adsorbs an amount of NH3 equal to or greater than a regeneration amount of NH3 consumed during regeneration of the filter.*

*13. The exhaust gas purification apparatus of an internal combustion engine as set forth in claim 10, wherein the controller is further configured to interrupt the second control when an amount of NH3 adsorbed on the NOx selective reduction catalyst is less than a predetermined value.*

*14. The exhaust gas purification apparatus of an internal combustion engine as set forth in claim 10, wherein the controller is further configured to interrupt the second control when a temperature of the NOx selective reduction catalyst exceeds a threshold value.*

*15. The exhaust gas purification apparatus of an internal combustion engine as set forth in claim 10, wherein the controller is further configured to:*

*set a period of time for performing the first control: and perform the first control until the period of time has expired.*

*16. The exhaust gas purification apparatus for an internal combustion engine as set forth in claim 15, wherein*

*the period of time is reduced upon a determination that the NOx selective reduction catalyst has deteriorated.*

* * * * *